No. 619,620. Patented Feb. 14, 1899.
C. L. ROSENQVIST.
ELECTRIC MOTOR.
(Application filed Apr. 4, 1891.)
(No Model.) 2 Sheets—Sheet 2.
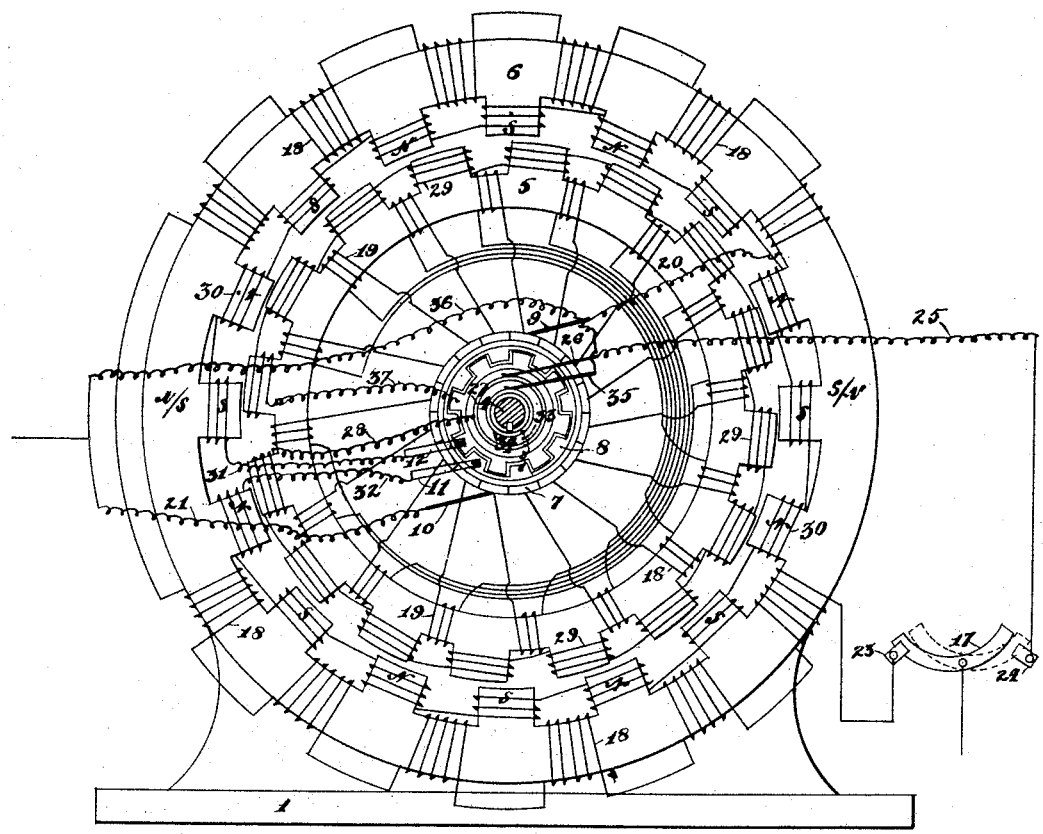
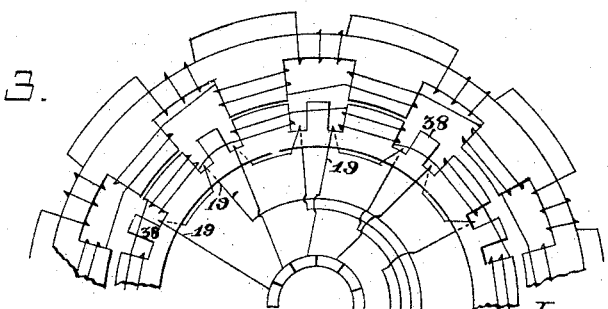
Witnesses
W. A. Courtland
J. C. Spaeth
Inventor
Conrad L. Rosenqvist
by Reade Worthington
Attys.
THE NORRIS PETERS CO., PHOTO-LITHO., WASHINGTON, D. C.

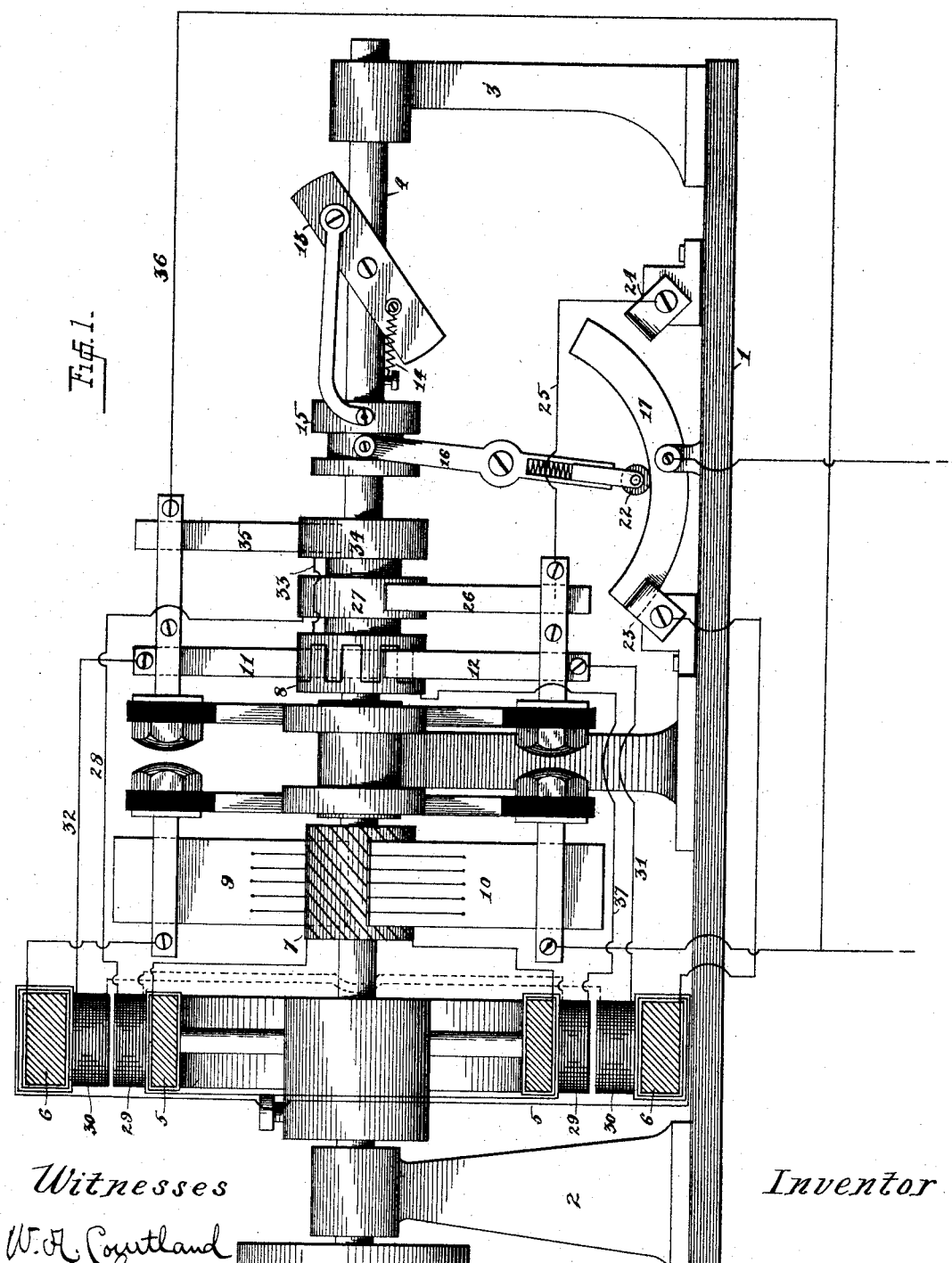

UNITED STATES PATENT OFFICE.

CONRAD LUDVIG ROSENQVIST, OF NEW YORK, N. Y., ASSIGNOR TO THE EXCELSIOR ELECTRIC COMPANY, OF SAME PLACE.

ELECTRIC MOTOR.

SPECIFICATION forming part of Letters Patent No. 619,620, dated February 14, 1899.

Application filed April 4, 1891. Serial No. 387,700. (No model.)

*To all whom it may concern:*

Be it known that I, CONRAD LUDVIG ROSENQVIST, a citizen of the United States, residing at New York, in the county of New York and State of New York, have invented certain new and useful Improvements in Electric Motors; and I do hereby declare the following to be a full, clear, and exact description of the invention, such as will enable others skilled in the art to which it appertains to make and use the same.

This invention relates to alternating-current motors.

It is a well-known fact that when a motor connected in an alternating-current circuit is brought up to such speed as to be synchronous with the waves of current flowing over the circuit the synchronous speed will be preserved and the motor will resist considerable effort tending to throw it out of synchronism. The difficulty with such motors for practical purposes is that when a call for extra duty is made upon the motor, or, in other words, when it takes on considerable increase of load, it is retarded sufficiently to be thrown out of synchronism with the waves of supply-current and will not operate at all. Another difficulty experienced with such motors is that of bringing them into synchronism with the changes of line-current.

It is the object of my invention to correct these difficulties and to provide a synchronous alternating-current or pulsating-current motor which may be readily brought up to a speed which will enable it to operate as a synchronous motor and in which in case of an overload or any other contingency which would throw the motor out of synchronism such synchronism will be automatically reestablished.

My invention consists, substantially, of a motor having collecting-rings, commutator devices, and suitable armature and field windings or circuits adapted, respectively, for synchronous and non-synchronous starting operation, and a switch which serves to direct the alternating current through an armature and field circuit of the motor in series for starting and then to direct alternating currents through an armature-circuit by way of the collecting-rings and a rectified current through the field by means of the commutator device, said circuits being for both synchronous and non-synchronous operation upon the same armature and field cores or structures.

My invention consists, further, in using independent windings upon the same armature for the synchronous and non-synchronous operation, said windings being combined with suitable switches, commutating devices, collecting-rings, and a magnet proper for both operations.

My invention consists also in using two independent windings throughout for both armature and field, as hereinafter described, and, further, in the combination, with the circuits and arrangements claimed, of an automatic switch responsive to changes of speed for changing the electric condition of the motor from non-synchronous to synchronous.

The invention consists also in the combinations hereinafter claimed.

The term "non-synchronous" is for the sake of convenience hereinafter employed to designate that kind of motive apparatus operating under the influence of alternating currents which will develop a torque under the influence of such alternating current irrespective of the rate of frequency of the alternations or the speed of rotation of the armature, while the term "synchronous" is applied in accordance with usage to designate that class of motors which require that the armature should move in synchronism with the alternations in order to operate in the best manner.

In the accompanying drawings, which illustrate this invention, Figure 1 is a side elevation, the field-magnet and armature being shown in section, of a motor embodying my invention. Fig. 2 is a diagrammatic view illustrating the invention. Fig. 3 is a detail view illustrating a modification of the non-synchronous armature-winding.

Reference being had first to Fig. 1, 1 is a bed-plate provided with standards 2 3, upon which is mounted a shaft 4. 5 is the armature, mounted upon the shaft, and 6 is the field-magnet, supported by the bed-plate in any suitable manner. The field-magnet and armature are of the annular type provided with polar projections, upon and between which are wound the magnetizing-coils. Suitable commutating devices for the non-synchronous and synchronous operations are mounted upon the armature-shaft. If desired, two independent commutators may be employed for this purpose, only one of which is at any time operative in directing current through the motor. Upon these commutators bear brushes 9 10 and 11 12, the former pair acting to direct current through the armature when the operation is that of a non-synchronous motor and the latter pair serving to commutate the field-magnet circuit so as to carry current through the same in a uniform direction when the motor is operated as a synchronous motor. Upon the shaft 4 is also mounted a centrifugal governor 13, which is normally retracted by the spring 14 and held in the position shown in the drawings, but at a given speed acts with a centrifugal effort to elongate the spring and shift a sleeve 15 longitudinally upon the shaft, thereby rocking a lever 16 and tilting a switch-arm 17 so as to disconnect it from one set of connections and cut it into circuit with another set. It will thus be understood that so long as the motor is operating at a low speed the centrifugal governor preserves the connection of one system of motor-circuits with the supply-terminals and that when the motor attains a desired speed, which will be that in which synchronism exists, a new set of circuits will be formed automatically and the motor preserved in rotation as a synchronous motor. Regulation of the tension of the spring 14 adapts the governor to the best condition to shift the connections when synchronism is established.

The motor will be better understood upon examination of Fig. 2 of the drawings, wherein 5 is the armature and 6 the field-magnet core, each of which is properly wound or has proper circuits for both synchronous and non-synchronous operation. If desired, two independent windings may be employed for the armature and two also for the field. If independent windings are used on both, it is desirable that one winding should be wound upon the projecting pole-pieces and the other between them, or in ring fashion, though it is obvious that any method of applying the windings to magnetize the structure in any of the ways suitable for the two methods of operation and as well known in the art might be employed. The field-magnet and armature cores are made of laminated iron in a manner well understood in the construction of alternating-current apparatus. A field-magnet circuit 18 is wound so as to develop consequent field-magnet poles at N S and S N and in the neighborhood thereof. The windings on the upper part and the lower part of the field-magnet are connected in series and reversely wound, so as to develop such consequent poles. 19 represents one of the armature-coils of the non-synchronous system. These coils are all similarly wound and the similar terminals of all are connected with the respective bars of the commutator, the free terminals of diametrically opposite coils being connected together. The bars of the commutator are given a partial turn in a spiral direction about the surface of the commutator-disk, so that a single wide brush 9 or 10 (see Fig. 1) will span several blocks. These brushes are preferably split, as indicated in Fig. 1, so as to provide a series of tongues capable of bearing independently on any block upon which it may rest and therefore maintaining a good contact. The bars of the commutator, as illustrated, are given such a twist as to couple about two-thirds of the armature-coils into circuit. Inasmuch as each brush spans six blocks, six pairs of the armature-coils will at any instant be thrown into circuit, and these coils will be grouped in multiple arc, thus offering but slight resistance to the flow of alternating current through the armature system, and also reducing sparking by reason of the multiple arc as contradistinguished from a series grouping of the armature-coils. As the switch 17 is set in Fig. 2 the circuits of the motor when operating in a non-synchronous manner are connected with the supply-circuit. As indicated, the current enters the field-magnet system, passing through the field-magnet coils 18 in series and developing consequent poles at the points marked N S and S N in the field-magnet system, although, of course, these poles will alternate in polarity under the influence of the waves of alternating current. As will be understood from inspection of the diagram, Fig. 2, the polar projections at the point where the pole will be developed in the field-magnet when the motor is operating as a non-synchronous motor are somewhat longer than the other polar projections of the field-magnet core. This provision is made in order to concentrate the lines of force within a definite path from the field-magnet to the armature, so that the lines flowing from the field will be in the best active relation with reference to the polar line of the armature. After passing through the field-magnet coils current then passes to the armature through wire 20 and brush 9 to the commutator, whence it is distributed in multiple arc to the coils which are connected with the commutator-bars at the moment under the brushes and passes out by way of brush 10 and wire 21 to the other terminal of the motor. Under these conditions, the field-magnet and armature core being finely laminated, the motor will develop a torque under the influence of an alternating current irrespective of its rate of frequency and will start from a state of rest, gradually acquiring a higher speed until its driving power is balanced by friction, counter electromotive force, and other causes. Before it reaches this point, however, the synchronous stage will be attained and a sufficient centrifugal force will be developed in the pivoted arm 13, Fig. 1, to rock lever 16 on its pivot, causing the roller 22 to tilt the switch-bar 17, open the circuit at 23, thus cutting the non-synchronous system out of circuit, and closing the circuit at 24, cutting the synchronous circuits into connection with the supply-current. The action of the switch is a snap action, owing to the fact that the roller cannot actuate the lever until it passes over the center, but after passing over the switch is thrown by the coiled actuating-spring bearing, as indicated, against the stem carrying said roller. By using a snap-switch I obviate the difficulties which would arise from the switch hanging between synchronous and non-synchronous position, as would be the case if it were connected positively with the pivoted arm. Current will then pass from the switch 17 to contact 24, from 24 by way of wire 25 to brush 26, bearing upon a ring-contact 27, and proceed thence by wire 28 to the armature-circuit 29, the coils of which are wound upon the polar projections of the core 5. These coils are all connected in series and reversely wound upon consecutive projections, so as to alternately develop north and south poles in any number of adjacent projections. After passing through the entire series of armature-coils current passes by wire 37 to the one segment of the two-part commutator 8. This commutator is made up of two rings, each provided with a series of tongues and grooves, (see Fig. 1,) so that when placed together the tongues of the rings will interlock, the grooves being sufficiently wide to prevent the tongues from forming a contact. The tongues are all made of the same width, and the brushes 11 12 are so set that at any given instant they will connect, respectively, with opposite rings of the two-part commutator. Under rotation of the armature-shaft, therefore, this commutator will place the brushes 11 and 12 each in connection successively with the opposite ends of the field-magnet circuit 30, thus serving to rectify the reverse currents in the field-magnet circuit and preserving a continuous magnetism of like sign in the field-magnet poles. After traversing the circuit which has been traced current will pass, as stated, by wire 37 to one segment of the two-part commutator, thence by way of brush 12 and wire 31 to field-magnet circuit 30, through the coils of this circuit in series, magnetizing successive polar projections N and S, and back by way of wire 32 to brush 11, thence to the other segment of the two-part commutator 8 and by wire 33 to ring-contact 34, brush 35, and wire 36 to the other terminal of the motor. It will thus be seen that when the motor attains a synchronous pace the series of coils which surround the projecting pole-pieces of the field-magnet and armature will be cut into circuit and a multipolar field-magnet of continuous polarity is maintained, while the armature-current is reversed when the polar projections of the two coincide in position. A continuous torque will therefore be developed upon the armature, and the motor will operate synchronously until synchronism is destroyed by overloading or some other cause, and when thrown out of synchronism the motor will slow down until the stress of the spring 14 will shift the governor 13 and cut in the other set of circuits, when the motor will operate as a non-synchronous motor until the period of extra duty has passed, and will then gradually speed up and again cut into circuit the synchronous system.

It will be evident from the structure of the non-synchronous motor that it will operate under the influence of alternating, pulsating, or direct currents. By giving the commutator bars or segments more or less twist the brushes may be made to connect only a desired number or all of the armature-coils in multiple arc. I prefer to give them such a twist as to render about two-thirds of the armature-coils active, those not cut in in any given position being on open circuit, thus reducing the sparking and tendency to heat the coils. It will also be seen that the several armature-circuits of the non-synchronous motor are independent and that they are greater in number than the number of field-magnet poles, thus rendering it possible to have several armature-circuits always active and several idle or on open circuit.

In order to prevent the induction developed in the non-synchronous coils 19 of the armature when the motor is operating as a synchronous motor, the winding may be arranged as illustrated in Fig. 3 of the drawings. I find in practice that when the motor is run synchronously current is developed in the coils 19, which for the time being should be idle coils, and in order to prevent this a portion of each coil 19 may be wound on each side of the polar projection of the armature. It results from this that the lines of force flowing from the polar projections of the field to the polar projections of the armature flow in opposite directions through each section 19 19' of each coil, thus causing the induction created in one section to neutralize that created in the other and yet not interfering with the function of the coils 19 when the motor is operating on a non-synchronous principle. I find it also advantageous in increasing the torque when the motor is operating as a non-synchronous one to introduce iron lugs or extensions, as indicated at 38, between the polar projections of the armature. These practically make of the armature a continuous ring when the latter is operating as a non-synchronous motor and do not interfere with its operation as a synchronous motor.

It is obvious that in non-synchronous operation my motor behaves as would any series-wound continuous-current dynamo under the influence of alternating current and that as a motor system it is practically of the well-known open-circuit type. I do not therefore wish to be understood as limiting myself to the particular style or method shown of winding or applying the coils for non-synchronous operation, since as well-known other windings or applying coils to cores of armatures and fields would, as is well known, produce the same effect. So, also, as to synchronous operation, it being well known that armature and field coils differently disposed but both connected to an alternating-current circuit through the medium of rings and commutators, as described, would produce the same result of synchronous operation, I do not wish to be understood as limiting myself to the one special disposition shown.

While I have described a non-synchronous system as a two-pole motor, it might be made multipolar without departing from the spirit of the invention. Such an end could be readily accomplished by simply changing the terminals of the coils so as to develop consequent poles at more than two points. I desire to have it understood also that the non-synchronous motor is not restricted for operation to alternating and reverse or pulsating currents, as it will operate efficiently with direct currents, the field-magnet and armature poles being continuously maintained in active relation to each other, so that torque will be exerted irrespective of the direction of current at any instant.

While I have described the commutator-bars as given a spiral or inclined relation to flat brushes in order to group the coils in multiple arc, the same result may be accomplished by setting the brushes in an inclined position, so as to always bear on a plurality of bars. In this case, of course, the contacting edge of the brushes would be curved in shape, so as make contact over the curved surface on which they would bear.

Having thus described my invention, what I claim as new, and desire to secure by Letters Patent, is—

1. An alternating or pulsating current motor having two field-magnet circuits mounted upon a common core, and means for rectifying the current in one circuit to maintain a constant field magnetism, only one circuit being active at a time.

2. In an alternating-current motor, the combination of a non-synchronous system provided with means for developing a variable field magnetism and having both field and armature circuits connected in an alternating or pulsating current circuit, with a synchronous system provided with an independent armature-circuit and means for commutating the current supplied to produce continuous field magnetism, both systems operating to rotate the machine, and means to cut in the operative circuits of the synchronous motor when synchronism is attained.

3. A combined synchronous and non-synchronous motor having different armature-circuits on the same core, one for non-synchronous and the other for synchronous operation, and provided with means for cutting in the synchronous circuit and cutting out the non-synchronous circuit when synchronism is attained.

4. An alternating-current motor organized with circuits for synchronous and non-synchronous operation and having a common field-magnet and armature core for both circuits, each circuit having a magnetizing system for both field and armature in a circuit independent of the other, and means for cutting the non-synchronous system out of and the synchronous system into circuit when synchronism is attained.

5. A combined synchronous and non-synchronous alternating-current motor provided with two sets of armature-windings, a commutator in the non-synchronous system for maintaining the polar line of the armature in active relation to the field-magnet poles, whereby a continuous torque is maintained under the alternating current, and a commutator in the synchronous system for rectifying the field-magnet currents, whereby a continuous torque may be exerted when synchronism is attained.

6. The combination of a synchronous and non-synchronous motor, a centrifugal governor operated by the rotating shaft, and a switch operated thereby to automatically switch current from the non-synchronous system when the proper speed is attained.

7. A non-synchronous electric motor for alternating, pulsating or direct current provided with an armature wound with a greater number of independent circuits than the field-magnets have poles, and a commutator for connecting said circuits in multiple-arc relation in combination with synchronous motor-coils wound on armature and field and giving the same number of poles on both.

8. A non-synchronous electric motor for alternating, pulsating or direct current provided with a laminated field-magnet and armature core, a number of independent circuits wound upon the armature, and a commutator for connecting a plurality of such circuits in multiple-arc relation in combination with synchronous motor-coils connected in series on the said armature.

9. The combination with an alternating-current-motor apparatus organized for synchronous and non-synchronous working, of a snap-switch for changing all the circuits of the apparatus from condition of synchronous to condition of non-synchronous working, and means responsive to change of speed for automatically bringing said switch into action.

10. An alternating-current motor having two independent sets of armature-circuits wound on the same core one of which creates a torque upon the spindle during the passage of alternating current irrespective of the speed of rotation, the other of which develops torque as long as synchronism lasts, and means for automatically cutting the latter into circuit on attainment of a predetermined speed under the action of the first.

11. A combined synchronous and non-synchronous alternating-current motor provided with two armature-circuits wound on the same core for the synchronous and non-synchronous portions, one of said circuits including coils that conspire to produce poles and are connected to a proper commutator for non-synchronous operation the other being a coil-circuit wherein the coils produce for synchronous operation a series of poles on radial cores for said coils, and means for opening the non-synchronous armature-circuit and closing the synchronous when the machine has attained speed.

12. In an alternating-current motor, the combination substantially as described, of a synchronous alternating system of coils, a non-synchronous armature-circuit including coils upon the armature of the synchronous portion, an electric switch for breaking the non-synchronous circuit, and means for automatically operating said switch on the attainment of a predetermined speed under the torque developed by the non-synchronous portion of the apparatus.

13. An electric motor for alternating or pulsating currents, comprising a bipolar magnetic system, a commutator for maintaining the poles continuously in active relation to develop rotation under impulses of any frequency, a synchronous multipolar magnetic system provided with a commutator for rectifying the field-magnet current, and means for automatically cutting the synchronous system into action when synchronism is attained by the non-synchronous system.

14. An alternating-current motor provided with two systems tending to operate the same rotating shaft, one system being provided with a commutator for rectifying the field-magnet currents and operative at any frequency of reversal, the other system being operative when the motor is in synchronism with the generator, a centrifugal governor driven by the rotating shaft, and a switch actuated by said governor when synchronism is attained to cut into circuit the synchronous system.

15. An electric motor comprising a multipolar armature and field-magnet wound for synchronous action, a commutator for rectifying field-magnet currents under synchronous operation, and a non-synchronous winding for developing a set of coöperating consequent poles in the field-magnet and armature respectively at any speed of rotation the polar projections at the consequent points in the field approaching closer to the armature than the polar projections elsewhere.

16. An alternating-current motor comprising a multipolar field-magnet and armature containing a synchronous winding and a commutator for rectifying the current in the field-magnet coils, and a non-synchronous winding for the field-magnet and armature for developing consequent poles therein irrespective of the speed of rotation, each armature-coil for the non-synchronous system being independent of the armature-coils for the synchronous system and having half of its convolutions on opposite sides of a polar projection.

17. An alternating-current electric motor organized to start by passing an alternating current through an armature-circuit and field-winding thereof in series, and having an independent armature-circuit for synchronous running combined with a source of alternating-current supply and means for passing the alternating current uncommutated through said independent armature-circuit and passing rectified current taken from the alternating-supply source through an exciting-field winding when the speed of the motor becomes synchronous with that of the generator.

18. An alternating-current electric motor organized to start with an alternating current passing through an armature and field-winding thereof, and having an independent winding on the same armature combined with means for passing the alternating current through said independent winding and leading commutated currents from the same armature through an exciting-field therefor after synchronous speed has been attained.

19. An electric motor provided with an ordinary commutator and suitable electric connections, collecting-rings with suitable electric connections and circuit-changing means whereby said motor may be started as an ordinary alternating motor with alternating field-magnets and subsequently changed into a synchronizing alternating motor with continuous field-magnets, and means for automatically bringing said switch into operation when synchronism is attained.

20. An electric motor having an armature provided with polar projections and provided with an ordinary commutator and suitable electric connections, collecting-rings with suitable electric connections, and means for changing at will the said electric connections of said motor, whereby the same may be started as an ordinary alternating motor with alternating field-magnets and armature in series with one another and subsequently maintained in operation as a synchronous motor having continuous field-magnets, and an armature-circuit including in series armature-coils wound on the polar projections of the armature.

21. In an alternating-current-motor apparatus the combination of a stationary element, a moving element having two windings and means for supplying first alternating currents to the stationary element and one winding of the moving element through a commutator, and when the machine has reached synchronism supplying alternating currents to the other winding of the moving element and rectified currents to the stationary element, substantially as described.

22. In an alternating-current-motor apparatus the combination of a stationary element, a moving element, means for supplying alternating currents to the stationary element and through a commutator to the moving element, and means which come into action automatically when synchronism is reached for supplying alternating currents to the moving element and rectified currents to the stationary element, substantially as described.

23. In combination, a source of alternating currents, a motor, and an intermediate switch; the said motor having a circuit through its commutator and armature and field winding in series, and another circuit through the armature via collector-rings and through the field-winding via a rectifying-commutator, the said switch being adapted to control said circuits.

24. In a dynamo-electric machine or electric motor, a field-magnet having a winding included in the external circuit of the armature, the combination with the said armature having independent windings, one for synchronous operation of the motor on an alternating circuit and the other a starting-winding, a source of alternating current, and a switch for closing the circuit of the said source first through the starting-winding and the field-winding in series and then by a reversal of the switch through the synchronous winding and the field-winding.

25. In an alternating current electric motor, an armature having two sets of windings, one being a starting-winding and the other a winding for synchronous operation electrically independent of and disconnected from the starting-winding, and a switch for throwing said windings into circuit for starting or synchronous operation.

26. A dynamo-electric machine consisting of a field-magnet, an armature having a rectifying-commutator and collecting-rings connected to its windings, and a switch which serves first to direct alternating current through the commutator to the armature and field in series and afterward alternating currents through the collecting-rings to the armature-circuit and a rectified or continuous current through a field-winding.

In testimony whereof I affix my signature in presence of two witnesses.

CONRAD LUDVIG ROSENQVIST.

Witnesses:
   E. C. GRIGG,
   VICTOR E. BURKE.